March 1, 1949.  S. I. MacDUFF ET AL  2,462,983

FLUID ACTUATED VALVE

Filed Oct. 20, 1943

INVENTORS
STANLEY I. MacDUFF
HAROLD B. SCHULTZ
BY Cecil F. Arens
ATTORNEY.

Patented Mar. 1, 1949

2,462,983

UNITED STATES PATENT OFFICE 2,462,983

FLUID ACTUATED VALVE

Stanley I. MacDuff and Harold B. Schultz, South Bend, Ind., assignors to Bendix Aviation Corporation, South Bend, Ind., a corporation of Delaware Application October 20, 1943, Serial No. 506,970

5 Claims. (Cl. 137—153)

This invention relates to fluid pressure systems of the kind in which one or more motor units may be operated directly from a pump and/or an accumulator adapted to store fluid pressure generated by the pump.

On airplanes, automobiles and machine tools where it is necessary to employ more than one fluid pressure system, each of which may at times be under pressure, and at other times not under pressure, and where the delivery requirements of each system may or may not be simultaneous or alternate, it has been the practice to make the systems completely independent, with a separate pump for each system, the output of which was proportioned to the demand of the respective systems.

This invention proposes serving at least two such systems from a single pump in such a manner that the operation of neither system is affected by variations of pressure in the other system. The invention is particularly adaptable to an automotive vehicle having one system supplying a fluid power steering gear which requires a substantially constant flow of fluid at all times and another system supplying fluid pressure to the accumulator for operating brakes, doors, windows and the like. In the latter system fluid is stored under pressure in the accumulator so as to be made available at times when the pump output alone is not sufficient to satisfy the requirements of both systems.

The device of the invention is shown interposed between two parallel hydraulic systems on a vehicle such as an automobile but this application of the invention is only for the purpose of exemplification, the invention being equally applicable for use in any set of parallel hydraulic or other fluid pressure systems.

It is an object of the present invention to provide a valve capable of dividing the total output from a pump between a plurality of hydraulic systems to which it is connected.

Another object of the invention lies in the provision of a valve which will divide the fluid according to the demands of the independent systems to which it is connected.

Yet another object of the invention lies in the provision of a valve responsive to pressure differentials to completely close off one of said hydraulic systems to which said valve is connected should the other of said systems manifest a deficiency of fluid flow.

Still another object is to provide a valve which will admit fluid pressure to both systems to which it is connected simultaneously dependent upon the pressure requirements of the independent systems at any one time.

A still further object is to provide a valve connecting a plurality of hydraulic systems, which will admit the free flow of fluid through each of the independent systems coinstantaneously independent of the pressure requirements of the independent systems at any one time.

Other objects and advantages of the invention will become evident from the specification and drawing in which:

Figure 1 illustrates two independent hydraulic systems connected in parallel and adapted to terminate in a valve 10 to be hereinafter described in more detail.

Figure 1:
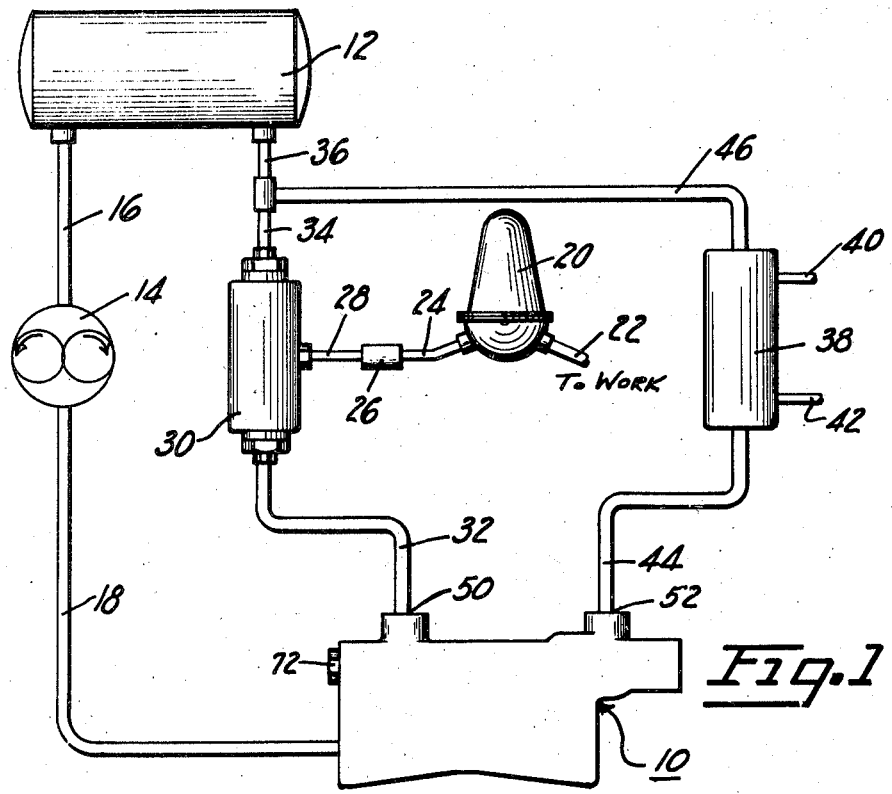
Figure 1 is a diagrammatic view of a portion of two independent hydraulic systems incorporating a valve of this invention.

Fluid pressure to the two systems is provided by a reservoir 12 and pump 14 connected to the valve 10 by conduits 16 and 18. In the hydraulic system shown, pressure is generated by the pump 14 which is driven by an engine of a vehicle, not shown, with which the system is associated. The pump output or delivery is dependent upon the engine speed to which the pump is geared.

One of the systems or branches comprises an accumulator 20 having a conduit 22 connected to the work, not shown, and a conduit 24 connected to a check valve 26 adapted to preclude the reverse flow of fluid from the accumulator to the reservoir. A pipe 28 connects the check valve 26 to a regulator valve or unloading valve 30 which maybe of the type disclosed in Patent 2,393,571. The unloading valve 30 is joined to the valve 10 by a conduit 32 and to the reservoir 12 by conduits 34 and 36.

The other system or branch comprises a steering valve 38 of a type known in the art as an "open center" type of control for pressure fluid. In an "open center" type of steering control the fluid of the system into which the valve is inserted is caused to flow continuously. The steering valve 38 has conduits 40 and 42 terminating therein and connected to a steering mechanism, not shown. Conduits 44 and 46 unite the steering valve 38 with valve 10 and conduits 34 and 36 respectively.

In order to divide the fluid pressure generated by the pump between the two independent or parallel systems, a dividing valve 10 having a body portion 48 is provided. The body portion 48 has outlet ports 50 and 52 therein adapted to connect to the parallel systems. An inlet port 53 of the body portion is connected to the pump 14 and reservoir 12 through conduits 16 and 18. A hydraulic connection is established between the inlet and outlet ports by a bore 54 having concentric recesses 55, 56 and 57, a Venturi passage 58 having a throat 59, and passages 60 and 62. A valve member 64 having a pair of annuluses 66 and 68 is slidable within the bore 56 and is urged to the left, as shown, by a spring 70 to close outlet port 50. A plug 72 threadedly engages the bore 54 and closes one end of the bore. The plug 72 provides an abutment for a conical portion 74 integral with the member 64 to thereby limit the movement of said member in one direction.

Member 64 has a coaxial passage 76 terminating in a chamber 78 formed by the body portion 48 and one end of member 64. The other end of passage 76 is connected to a transverse passage 80 which terminates in a space 82 formed by the body portion 48 and the annulus 66. A passage 84 in the body portion establishes communication between the Venturi throat 59 and the space 82. The annulus 68 of the member 64 provides for flow of fluid from the passage 62 to the outlet 52. The wall 63 separating the recesses 56 and 57 is of the same diameter as the bore 54 and is adapted to cooperate with the valve member 64 to restrict the passage of fluid to the outlet 52.

The annulus 68 of the valve member 64 is so proportioned that irrespective of the pressures acting on the valve member within the bore 54 fluid pressure can pass to the outlet 52 at all times. Of course, the amount of fluid passing to the outlet 52 will depend upon the opening between the valve member 64 and the wall 63.

The size of spring 70 is determined by the delivery requirement to that branch of the hydraulic system into which the steering valve 38 is connected. That is, to increase the fluid flow in the system a stronger spring is used and conversely to decrease the fluid flow a weaker spring is necessary.

*Operation of the valve*

Description of the operation and function of the valve will be given with respect to a parallel hydraulic system used on a vehicle, such as an automobile, having an accumulator in one branch of the system and a steering valve for power steering in the other branch.

With the engine of the vehicle not running and consequently the pump not operating, there will be no fluid flowing past the inlet 53. The valve member 64 will be in an extreme left position closing outlet 50 to inlet 53 by reason of the spring 70 which urges the member against the plug 72 under these conditions.

With the engine running at idle speed fluid will flow to the dividing valve where the fluid will first pass to the steering valve 38 since the valve member 64 is to the left closing outlet port 50 and fully opening the passage to outlet 52. As long as the engine runs at idle speed the output of the pump will be absorbed by the power steering requirements and the port 50 will remain closed. At this time the reduction in pressure at the throat 59 transmitted to chamber 78 is insufficient to overcome the spring 70 and as a consequence valve 64 remains in closed position. Under these conditions the differential in the pressures acting on the ends of the valve member 64 is insufficient to overcome the spring 70.

Figure 2:
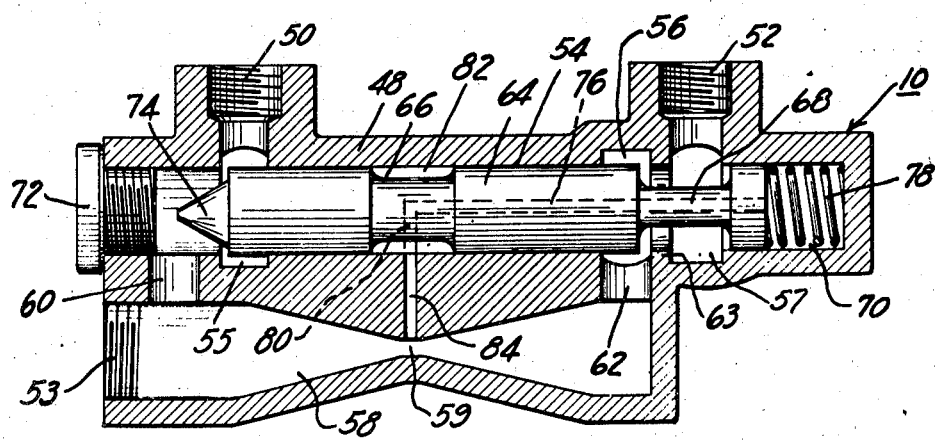
Figure 2 is a longitudinal sectional view of a valve of the present invention.

When the engine speed exceeds idle speed the pump output exceeds steering requirements for which the valve is designed and the valve member shifts to the right whereby outlet port 50 is opened to admit fluid pressure to the regulating valve 30. The amount of the opening of the valve is dependent upon the pump output. Movement of member 64 to the right, when the pump output exceeds a predetermined amount dependent upon the engine speed, is affected by a slight increase in flow through the Venturi passage which reduces the pressure at the throat 59 of the passage and consequently the pressure in chamber 78 acting on the right end of the member. This reduction in pressure in chamber 78 and concurrent increase in pressure on the left end of member 64 creates a differential pressure on the ends of the valve with the dominating pressure acting to move the valve to the right to open position. At this time, the valve member will be in the position shown in Figure 2.

So long as the pump output exceeds the fluid pressure required in the steering system, a nearly constant volume of fluid will pass the Venturi throat 59 and flow through the outlet 52 to the steering system with the excess fluid flowing to the regulator 30. This will be true independent of the pressure in either system, since the position of the valve member 64 governing the restriction, and therefore the pressure to either system, depends only upon the quantity of oil flowing through the Venturi throat 59.

Should the steering valve 38 close to build up pressure in that branch of the hydraulic system, the quantity of oil flowing through the Venturi throat 59 will tend to reduce, thereby increasing the pressure on the right end of the valve member. This increased pressure on the valve member will move said member to the left to restrict the flow of fluid to the regulator valve 30 until a position is reached which will give the desired flow to the steering valve 38.

When the steering valve 38 of the one system and the unloading valve 30 of the other system are both open to the free passage of fluid to the reservoir 12 and the unloading valve closes to charge the accumulator 20 there will be a tendency, because of the increase in pressure in the mouth of the venturi 58, to increase the flow to the steering system. This will cause a reduced pressure in the Venturi throat 59 which will be communicated to the right end of valve member 64, forcing the member to the right until a balance is found where the steering system is receiving its predetermined rated flow which, of course, is dependent upon the size of the spring 70.

It will be understood that various changes and details of construction can be made to suit different conditions of use and it is therefore to be understood that the invention is not restricted to the particular construction shown and described herein, nor otherwise except in accordance with the scope of the subjoined claims.

We claim:

1. A valve having an inlet port, outlet ports, a passage connecting the inlet port to one of the outlet ports, a restricted passage connecting the inlet port to the other outlet port, means to control flow between the inlet and outlet ports comprising a valve member constructed and arranged to normally close said first mentioned passage to cut off flow between the inlet port and said one outlet port and to simultaneously open said restricted passage to establish flow between the inlet port and said other outlet port, said valve member movable in response to differential pressure acting thereon to open said first mentioned passage to establish flow between the inlet port and said one outlet port and simultaneously to tend to close said restricted passage to reduce the flow between the inlet port and said other outlet port, said valve member having one end so constituted that inlet pressure acts thereon, and a passageway constructed and arranged to connect the restricted part of the restricted passage to the other end of the valve member so that flow past the restriction creates a differential in pressure on said valve member to tend to move the same in a direction to establish flow between the inlet port and said one outlet port and restrict flow to said other outlet port.

2. A valve of the class described having a body, a bore in the body, two outlet ports, one in each end of the bore, an inlet port, a passage connecting the inlet port to one of the outlet ports, a passage including a venturi therein connecting the inlet port to the other outlet port, a valve member disposed in said bore constructed and arranged to control flow from the inlet port to the outlet ports, said valve member normally biased to close said first mentioned passage to cut off flow between the inlet port and said one outlet port and to simultaneously open said Venturi passage to establish communication between the inlet port and said other outlet port and movable from said normally biased position in response to pressure differential acting thereon to open said first mentioned passage to establish flow between the inlet port and said one outlet port and simultaneously restrict said second mentioned passage, and a passageway connecting the Venturi throat to one end of the valve member whereby flow past the Venturi throat will create a variable pressure on said one end of the valve member, the other end of said valve member constructed and arranged to be subjected to inlet port pressure at all times.

3. A valve comprising a pair of outlet ports, an inlet port, a first passageway connecting the inlet port to one of the outlet ports, a second passageway connecting the inlet port to the other outlet port, a bore intersecting the first and second passageways, a valve member in the bore biased in a direction tending to close the first passageway and constructed and arranged to alternately close said first passageway and to restrict said second passageway, a venturi including a Venturi throat located in the second passageway, and a passage in said valve member connecting the Venturi throat to one end of the bore so that flow past the Venturi throat varies the pressure acting in said one end of the bore to effect movement of the valve member in a direction to establish flow between the inlet port and said one outlet port and restrict flow to said other outlet port, the other end of the bore connected to the inlet port to subject the end of the valve member in that end of the bore to inlet port pressure.

4. A valve comprising outlet ports, an inlet port, a first passageway connecting the inlet port to one of the outlet ports, a second passageway connecting the inlet port to the other outlet port, a bore intersecting the first and second passageways, a valve member in the bore having annuluses spaced apart axially thereof and constructed and arranged to alternately close said first passageway and to restrict said second passageway, a chamber in one end of the bore, a spring in the chamber to engage said valve member to bias the same in a direction tending to close said first passageway, a chamber in the other end of the bore constructed and arranged to communicate with said first passageway to subject said second mentioned chamber to inlet pressure, a passage in the valve member connecting one of the annuluses to said first mentioned chamber in one end of the bore, said other annulus constructed and arranged to restrict the flow through the second passageway, a venturi including a Venturi throat located in the second passageway, and a passage connecting the Venturi throat to said one annulus to transmit a variable pressure to said chamber in said one end of the bore to effect movement of said valve member in a direction to establish flow between the inlet port and said one outlet port and restrict flow to said other outlet port in response to flow through said venturi.

5. A valve comprising an inlet port, a pair of outlet ports, a first passageway connecting the inlet port to one of the outlet ports, a second passageway connecting the inlet port to the other outlet port, a bore intersecting the first and second passageways, a valve member shiftable in the bore and constructed and arranged to alternately close said first passageway and to restrict said second passageway, a spring disposed in one end of the bore and constructed and arranged to engage one end of the valve member to bias the same in a direction tending to close said first passageway, and flow sensitive means in the second passageway including a passage connecting said flow sensitive means to said one end of the bore to thereby produce a variable pressure therein acting on said one end of the valve member, said other end of the valve member subjected to inlet port pressure to provide a pressure differential across the valve member to cause the same to move in a direction to establish flow between the inlet port and one of the outlet ports and restrict flow to said other outlet port.

STANLEY I. MacDUFF.
HAROLD B. SCHULTZ.

REFERENCES CITED

The following references are of record in the file of this patent:

UNITED STATES PATENTS

| Number | Name | Date |
|---|---|---|
| 1,934,578 | Temple | Nov. 14, 1933 |
| 2,018,119 | Brouse | Oct. 22, 1935 |
| 2,215,169 | Beeston | Sept. 19, 1940 |
| 2,219,488 | Parker | Oct. 29, 1940 |
| 2,242,002 | Klein | May 13, 1941 |
| 2,270,943 | Freundel | Jan. 27, 1942 |
| 2,280,128 | Price | Apr. 21, 1942 |